(12) United States Patent
Van Baelen et al.

(10) Patent No.: US 9,100,767 B2
(45) Date of Patent: Aug. 4, 2015

(54) CONVERTER AND METHOD FOR CONVERTING AN AUDIO SIGNAL

(75) Inventors: Wilfried Van Baelen, Mol (BE); Ralph Kessler, Hamburg (DE)

(73) Assignee: AURO TECHNOLOGIES, Mol (BE)

( * ) Notice: Subject to any disclaimer, the term of this patent is extended or adjusted under 35 U.S.C. 154(b) by 982 days.

(21) Appl. No.: 13/130,737

(22) PCT Filed: Nov. 20, 2009

(86) PCT No.: PCT/EP2009/065587
§ 371 (c)(1),
(2), (4) Date: Dec. 1, 2011

(87) PCT Pub. No.: WO2010/057997
PCT Pub. Date: May 27, 2010

(65) Prior Publication Data
US 2012/0070011 A1  Mar. 22, 2012

(30) Foreign Application Priority Data
Nov. 21, 2008  (EP) ..................................... 08169729

(51) Int. Cl.
*H03G 3/00* (2006.01)
*H04S 3/00* (2006.01)
*G01H 17/00* (2006.01)
*H04S 7/00* (2006.01)
*H04S 1/00* (2006.01)
*H04S 5/00* (2006.01)

(52) U.S. Cl.
CPC ............... *H04S 3/002* (2013.01); *G01H 17/00* (2013.01); *H04S 1/002* (2013.01); *H04S 5/005* (2013.01); *H04S 7/305* (2013.01); *H04S 2420/01* (2013.01)

(58) Field of Classification Search
CPC ...... H04S 1/002; H04S 2420/01; H04S 7/305
USPC ..................................................... 381/310, 63
See application file for complete search history.

(56) References Cited

U.S. PATENT DOCUMENTS

2005/0114121 A1* 5/2005 Tsingos et al. ................ 704/220

OTHER PUBLICATIONS

"Postmasking ED—Hugo Fastl; Eberhard Zwicker" Jan. 1, 2007, Psychoacoustics: Facts and Models (Third Edition), Springer Berlin, p. 83.*
Ahnert W et al: "Ears Auralization Software" Journal of the Audio Engineering Society, Audio Engineering Society, New York, NY, US, vol. 41, No. 11, Nov. 1, 1993, pp. 894-904.*

* cited by examiner

*Primary Examiner* — Joseph Saunders, Jr.
(74) *Attorney, Agent, or Firm* — Sughrue Mion, PLLC

(57) ABSTRACT

A converter and conversion method are disclosed for converting N channel audio input channels into M channel audio output channels, wherein a processor is used for applying a transfer function to a signal received on an input channel to obtain reverberation components of a calculated output channel, wherein said transfer function is a simplified transfer function matching a selected subset of a set of local maxima of a measured reverberation when applied to a corresponding stimulus.

20 Claims, 7 Drawing Sheets

CONVERTER AND METHOD FOR CONVERTING AN AUDIO SIGNAL

CROSS REFERENCE TO RELATED APPLICATIONS

This application is a National Stage of International Application No. PCT/EP2009/065587 filed Nov. 20, 2009, claiming priority based on European Patent Application No. 08169729.4, filed Nov. 21, 2008, the contents of all of which are incorporated herein by reference in their entirety.

The invention relates to a method for simplifying a model of an acoustic environment, wherein said model comprises a set of transfer functions, each transfer function corresponding to a set of sound propagation paths between a sound emitting position and a sound receiving position in said acoustic environment.

Such a model is known from "An example of adding spatial impression to recorded music: signal convolution with binaural impulse responses", Angelo Farina, Dipartimento Ingegneria lndustriale Università di Parma, Proc. of International Conference "Acoustics and recovery of spaces for music", Ferrara 27-28 Oct. 1993, where an acoustic environment is simulated in a converter by convolving audio signals with the transfer functions forming this model of an acoustical environment. For each of the N channels a set of convolutions is established to calculate the reverberation for each of the M channels such that the audio when played back through M channels is perceived as it was recorded in the modelled acoustical environment.

"EARS Auralization Software" by Ahnert W et al, Journal of the Audio Engineering Society, New York, N.Y., USA, vol. 41, no. 11, 1 Nov. 1993, pages 894 to 904, discloses an electronically auralized room simulation (EARS) for use in conjunction with electronic-acoustic simulator for engineers (EASE). From a room simulation in EASE 2.0, a simulated monaural room impulse response is created complete with directivity information, angles of incidence, The response can be stored in EASE post-processing files and convolved with outer ear transfer functions to derive a binaural auralization as a function of the selected listening poition in the room and the head orientation of the simulated listener.

"Perceptual Audio Rendering of Complex Virtual Environments" by Tsingos N et al, ACM Transactions on Graphics, ACM TUS LNKD-DOI: 10.1145.1015706.1015710, vol. 23, no, 3, 1 Aug. 2004, pages 249 to 258 discloses a real-time 3D audio rendering pipeline for complex virtual scenes containing hundreds of moving sound sources. More than ten times the number of sources available on consumer 3D audio hardware can be handled due to auditory culling and spatial level-of-detail with minimal decrease in audio quality. The method described performs well for both indoor and outdoor environments and leverages the limited capabilities of audio hardware for many applications, including interactive architectural acoustic simulations and automatic 3D voice management for video games. Inaudible sources are dynamically eliminated and the remaining audible sources are grouped into a number of clusters. Each cluster is represented by one impostor sound source positioned using perceptual criterion. Spatial audio processing is then performed on only the impostor sound sources thereby reducing computational cost. Limited degradation in audio quality and localization impairment is obtained which does not vary significantly with the cluster.

Nevertheless, a disadvantage of such models is that to achieve this expansion of the sound image to match the modelled acoustical environment, complex transfer functions representing a large number of sound propagation paths must be processed for each reverberation, resulting in high processing power and memory requirements for the converter.

It is an objective of the present invention to provide a method that reduces the processing power and memory required for simulating the modelled acoustic environment, yet still allow the resulting M channel audio signal to sound as if it were recorded in the modelled acoustical environment.

This objective is achieved in that the method according to the invention comprises the steps of
calculating a simulated reverberation of a first stimulus emitted at said sound emitting position as received at said sound receiving position by applying said transfer function to said first stimulus;
selecting a subset of a set of local maxima in an intensity envelope of the simulated reverberation; and
calculating a simplified transfer function which, applied to said first stimulus, provides a simulated reverberation with an intensity envelope matching said selected subset of local maxima.

The local maxima in the intensity envelope represent significant reverberation components, corresponding to predominant propagation paths in the modelled acoustic environment. Selecting a subset of these local maxima allows their match with a simplified transfer function, which can then be used to simulate the acoustic environment with reduced processing and memory requirements without a perceived reduction of the sound image quality.

Advantageously, the selected number of local maxima does not exceed a predetermined maximum. The maximum size and/or complexity of the transfer function is thus limited in advance, defining the processing and memory requirements that will be necessary to handle the simplified acoustic environment model.

Advantageously, said selected subset of local maxima are selected from among those above a time-intensity attenuation function.

By selecting such a subset of highest reflections, which show up as peaks in the intensity envelope of the reverberation above a time-intensity attenuation function, the most perceptible components are maintained and perceptible difference to the measured impulse response is kept at a minimum.

More preferably, said time-intensity attenuation function may be an exponential attenuation function. The resulting simulated reverberation cannot be distinguished by the human ear from a version where all reverberation components are included, yet the exclusion of reverberation components below said exponential time-intensity attenuation function substantially reduces the processing requirements and complexity.

Preferably, said simplified transfer function may be applied by convolution with said first stimulus. This provides a particularly faithful simulated reverberation.

In an alternative method producing an even simpler model of an acoustic environment, each simplified transfer function is expressed as a combination of a signal delay and a signal attenuation for each selected local maximum. In this case, the simulation can be carried out by applying these transfer functions to the audio signals in comparatively simple time domain operations, rather than by convolution.

The present invention also relates to a method for converting a first audio stream comprising N input channels into a second audio stream comprising M output channels, comprising the steps of, for each input and output channel:

selecting, in a model of an M-channel acoustic environment simplified using the abovementioned method, a simplified transfer function associated with said input channel and output channel;

processing at least part of an input signal from said input channel by applying said selected simplified transfer function so as to generate at least part of an output signal for said output channel.

It is thus possible, through the use of the simplified model, to simulate how the sound would be perceived in the modelled acoustic environment.

Preferably, M>N. This would thus enable the conversion of a first audio stream into a second audio stream with a higher number of channels. However, in alternative embodiments, M may also be lower or equal to N.

In a further embodiment of the method the selected subsets of local maxima are different for at least two of the M audio channels.

By purposely introducing differences in the simplified transfer functions of two channels it is avoided that the same signals are calculated for the two audio channels. Having two sources emit the same signal in a room will cause the system (room, loudspeakers and sound) to act as a comb filter causing uneven perception of the two channels throughout the room. Comb filtering happens if correlated signals come from different speakers.

To avoid this, the selection of local maxima in the envelope is purposely treated differently for the two channels, effectively causing a decoupling of the two channels.

The method allows, using two transfer functions, to artificially change a mono signal into a stereo signal by simulating the signal paths from a single source to two receiving points in a room. The two transfer functions are subsequently modified in order to select a different set of local maxima.

In a further embodiment of the method the selected sets of reflections are different for all M channels.

For a multi channel system it is advantageous to ensure that all M channels are decoupled, to prevent the system to act as a comb filter causing uneven perception of the two channels throughout the room.

Although the invention would normally be used to change a multi channel signal into another multi channel signal having even more channels, for instance converting a 2D audio signal into a 3D audio signal by calculating additional channels representing an additional layer of elevated speakers, in its extreme the invention can be used to convert a mono signal into a 3D signal by using a multitude of simplified transfer functions, one for each source speaker location combination and by ensuring a decorrelation of the M channels that the subset of selected local maxima are different for each of the M channels.

It is to be noted that these steps could also be used independently of other steps and/or features of the present invention, including the selection of a subset of local maxima.

In a particular embodiment of the invention, the output signal comprises an early part and a late part.

Such a late part normally tends to have few pronounced peaks associated with particular reflections. Consequently, the simplified transfer function may be used to generate only the early part, while the late part may be generated using other approaches, for instance a conventional approach as known from the abovementioned prior art, or an algorithmic reverberation method.

The early part tends to have several pronounced peaks representing dominant reflections where the method of the present invention allows a removal of the non-dominant reverberation components, thus reducing processing requirements complexity.

How the output signal is divided into said early and late parts may be determined according to sound type.

Different kinds of sounds have different divisions between the early part having several dominant local maxima and the late part having few or no dominant local maxima.

To reduce the processing requirements the division between early and late part can be adjusted to optimally apply the appropriate method to the appropriate part.

The late part of the reverberation can be advantageously removed, for instance for news reading.

A converter as claimed is advantageously used in an audio device. The audio device can convert for instance a 2 dimensional sound into a 3 dimensional sound having more channels than the 2 dimensional sound. This allows the converter to create a 3 dimensional impression from input channels that do not contain information about the third dimension.

Such an audio device comprising a converter as claimed may advantageously be in a motor vehicle.

The acoustic environment in a motor vehicle is often less than optimal and different from the acoustic environment in which many audio recordings are made.

The reverberation can be adjusted using the method and converter of the present invention allowing optimal reproduction of the sound in the motor vehicle's acoustical environment.

The invention will now be described based on figures showing the best mode for carrying out the invention.

Although the description refers to a convolution as a way to calculate the impulse response from an impulse excitation, or the M audio channels from the N audio input channels, the same can be achieved by simply applying delay and appropriate attenuation for each relevant direct or indirect (reflection) path to be simulated. This is a well-known alternative to using a convolution as found in student text books and is thus not described in detail.

Figure 1:
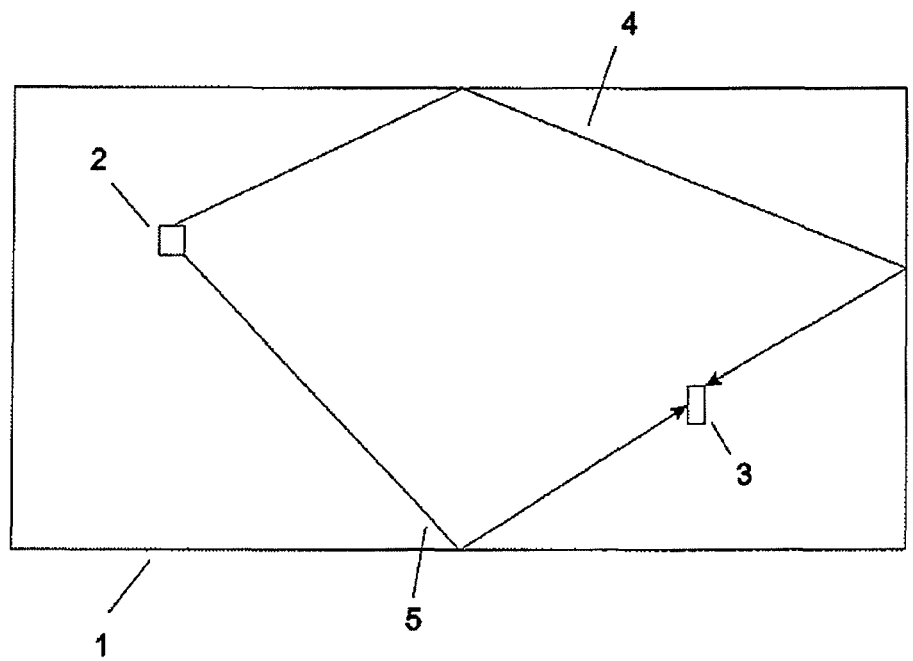
FIG. 1 shows a room with a measurement set up for characterizing the room.

FIG. 1 shows a room with a measurement setup for characterizing the room.

In an acoustical environment 1, for instance a room, an excitation source 2, for instance a loudspeaker, is positioned at a sound emitting position. At a sound receiving position a measuring device 3 is placed to capture the room's response to the stimulus by the excitation source 2.

In a preferred embodiment, the stimulus can be a Time Stretched Pulse. This is basically an exponential sine sweep, which provides several advantages over the older MLS (Maximum Length Sequence) method. One technique for obtaining higher S/N ratios involves recording multiple TSPs and then averaging; ambient noise and self noise of the equipment reduces 3 dB for any doubling of the number of recordings. However, a remaining problem of this technique is that speaker-induced distortion will not disappear.

Instead it is preferred to use a TSP wherein sweep length will be approximately 10 times as long as the estimated reverberation time of the measured room, typically resulting in a length of 15-80 s. This presumes measuring 10 octaves from start to stop frequency. The sweeps utilized should also be faded in and out to avoid artefacts.

Another factor with direct influence on the signal/noise ratio is loudspeaker power compared to the background noise level. It is recommended to use a calibration of 85 dBa SPL at 2 m distance by playing a −20 dbFS bandlimited (500-2000 Hz) signal. The sweep goes out 14 dB louder at −6 dBFS.

Such an impulse is thus provided via the excitation source 2 and sound waves travel along various paths, in FIG. 1 a first path 4 and a second path 5. Since the first path 4 and the second path 5 have different length the sound waves will arrive at different times at the measurement device 3, resulting in a reverberation being captured.

The reverberation is different for different measurement and excitation positions and based on measured reverberations a model of a room can be established. This method is widely known and can be found in "An Optimised Method for Capturing Multidimensional "Acoustic Fingerprints", by Ralph Kessler, Audio Engineering Society, Convention Paper, Presented at the 118th Convention, 2005 May 28-31 Barcelona, Spain, and in publications by Prof. Angelo Farina of Italy.

By constructing a transfer function of which the convolution with an impulse stimulus results in a simulated impulse response having a reverberation with an intensity envelope that closely matches that of the reverberation of the measured impulse response, the model of the room can be constructed as a set of such transfer functions corresponding to a set of sound emitting positions and sound receiving positions.

To create M audio channels the N input audio channels are convolved with the set of transfer functions, resulting in M audio channels having a sound image that resembles the modelled room.

Figure 2:
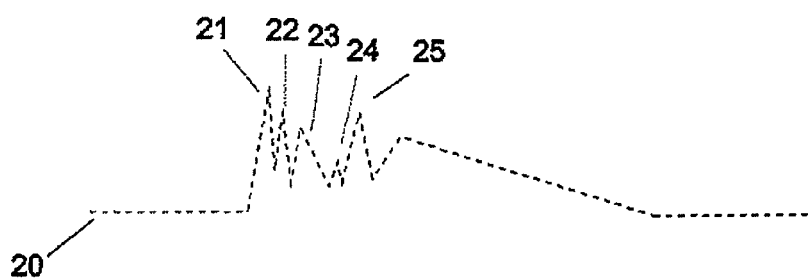
FIG. 2 shows an intensity envelope of a measured impulse response showing the reverberation at the measurement position in the room.

FIG. 2 shows a measured impulse response showing the reverberation at the measurement position in the room.

The intensity envelope 20 of the measured impulse response as a function of time is shown, on a logarithmic-linear graph, in FIG. 2 and comprises several local maxima 21, 22, 23, 24, 25 corresponding to multiple propagation paths in the room.

Depending on the characteristics of the room the reflections cause different amounts of delay and attenuation. The peaks 21, 22, 23, 24, 25 in the envelope 20 consequently have different positions and different amplitudes.

Figure 3:
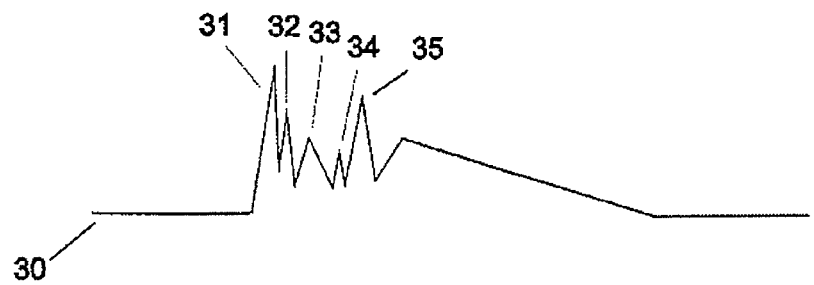
FIG. 3 shows an intensity envelope of a simulated impulse response obtained using a model of the room.

FIG. 3 shows a simulated impulse response obtained using the abovementioned model of the room.

The intensity envelope 30 of the simulated impulse response is shown in FIG. 3 and comprises several local maxima 31, 32, 33, 34, 35 that correspond to multiple propagation paths in the modelled room.

Depending on the modelled characteristics of the room different amounts of delay and attenuation are incorporated into the transfer function. By calculating the convolution between an impulse excitation and the transfer function the local maxima 21, 22, 23, 24, 25 in the envelope 30 are obtained and are positioned at the appropriate positions in the reverberation and having different amplitudes, matching the measured impulse response as close as possible.

Figure 4:
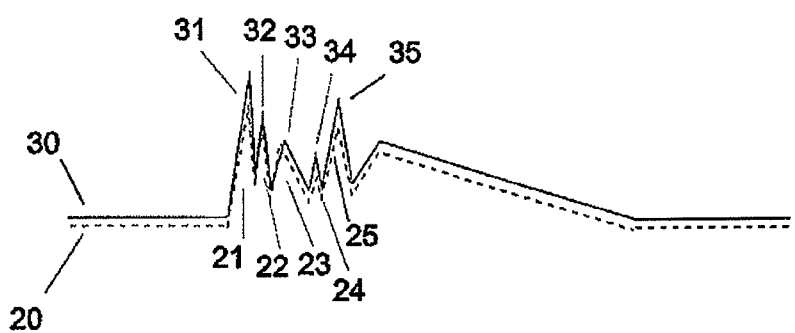
FIG. 4 shows the intensity envelopes of both the measured impulse response and the simulated impulse response.

FIG. 4 shows both the measured impulse response and the modelled impulse response.

The intensity envelope 20 of the measured impulse response and the envelope 30 of the calculated impulse response are overlapped for comparison and as can be seen, in this example a good match between the intensity envelopes 20, 30 has been achieved.

For instance the first local maximum or peak 31 in the calculated envelope 30 corresponds well to the first peak 21 of the measured envelope 20, showing that the transfer function matches the modelled room quite well.

Figure 5:
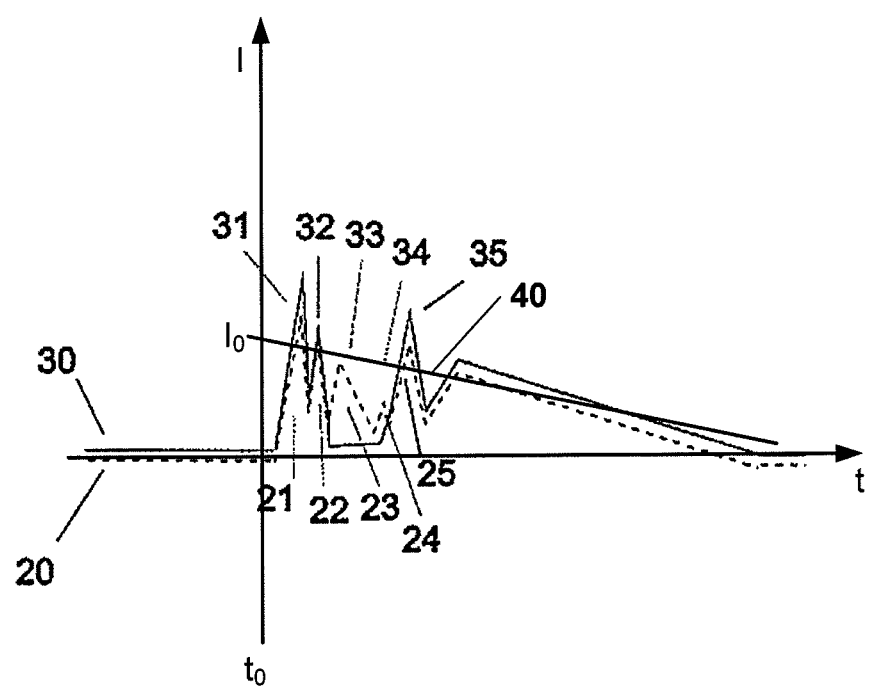
FIG. 5 shows the intensity envelope of the simulated impulse response after setting some components to zero, leaving only a predetermined number of highest reflections in the reverberation.

FIG. 5 shows the modelled impulse response after setting some components to zero, leaving only a predetermined number of dominant propagation paths in the reverberation.

In the present invention, in order to reduce the complexity of the convolution the transfer function is simplified. This simplification is verified by calculating the impulse response using the simplified transfer function and checking whether the resulting impulse response still matches the measured impulse response satisfactorily.

The criterion for checking the simplified transfer function is that a selected subset of the set of local maxima of the intensity envelope of the measured impulse response is still maintained in the intensity envelope of the simulated impulse response.

This means that some local maxima can be removed through modifying, i.e. simplifying, the transfer function. This is shown in FIG. 5 in that the first peak 31, second peak 32 and fifth peak 35 are still present in the intensity envelope 30 of the simulated impulse response, while the third peak 33 and the fourth peak 34 are no longer present. FIG. 5 shows the intensity envelope 20 of the measured impulse response for ease of comparison.

In a preferred embodiment of the invention, the number of the selected subset of local maxima 31, 32 and 35 is not higher than a predetermined number, for instance, in the illustrated example, not higher than three. This limits in advance the complexity of the simplified transfer function. Preferably, this selection is carried out by fitting, to the intensity envelope 20, a time-intensity attenuation function 40, as illustrated in FIG. 5, that undercuts the predetermined maximum number of local maxima to be selected, and selecting the local maxima reaching above it, which will be those more clearly perceived by the human ear. In particular, the time-intensity attenuation function may be, as shown, an exponential function according to the equation $I(t)=I_0 \cdot e^{(t_0-t)}$, wherein $I(t)$ is the intensity in function of time, $I_0$ the initial intensity, and $t_0$ the initial time.

In a particular embodiment, the simplified transfer function may be expressed as a signal delay and a signal attenuation for each selected local maximum. The calculation of the impulse response will thus be possible in a comparatively simple time domain operation, rather than by convolution.

Figure 6:
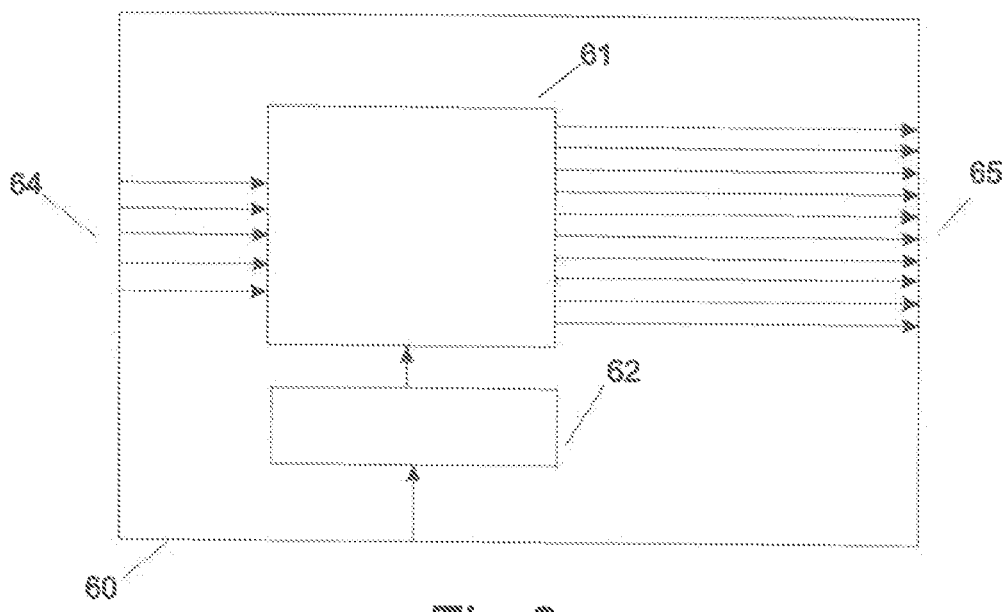
FIG. 6 shows a converter for converting N audio channels to M audio channels using a room model.

FIG. 6 shows a converter for converting N audio channels to M audio channels using a room model.

The converter 60 has input channels 64 connected to a processor 61 that can calculate multiple reverberations for various combinations of input channel and output channel. The output signals of the processor 61 are provided to output channels 65.

The transfer functions or parameters for the transfer functions to be used by the processor 61 are provided via a model input block which is arranged to receive information about the model or transfer functions from the parameter input 66.

In an embodiment of the present invention, said processor calculates, for each input and output channel combination, a convolution of the input signal with the corresponding simplified transfer function.

In another embodiment of the present invention, if the simplified transfer function is expressed as a combination of a signal delay and a signal attenuation for each selected local maximum, these are applied in time domain operations to the input signal.

A converter for separately processing the early part and the late part of the reverberation has input channels connected to a divider for dividing the input signals. The processor that can calculate multiple reverberations for various combinations of input channel and output channel so as to generate the early part of output signals. The late part is either not generated at all or generated by a separate processor also connected to the divider where the late part is for instance generated in a conventional manner, such as algorithmic reverberation.

The output channels are provided by the processors to a combiner where the resulting early and late parts for each channel are combined into a single output signal to be provided to the outputs.

The transfer functions or parameters for the transfer functions to be used by the processor are provided via a model input block which is arranged to receive information about the model or transfer functions from the parameter input.

Figure 7:
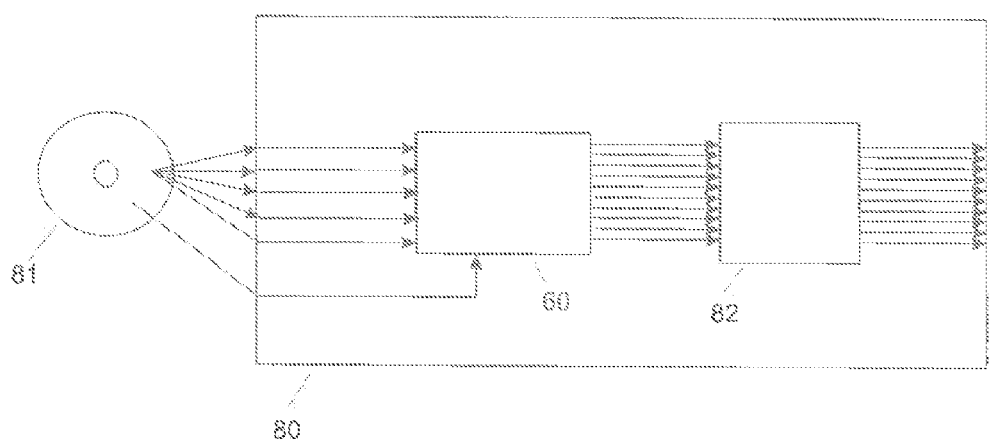
FIG. 7 shows an audio device comprising the converter.

FIG. 7 shows an audio device comprising the converter.

The audio device 80 comprises the converter 60, of FIG. 6 or a converter for separately processing the early and late part of the reverberation. The audio device receives N input channels, for instance from an optical disc 81 or a transmission channel (not shown). The N input channels are provided to the converter 60 to be converted to M channels. For this the converter needs information about the transfer functions to be used. This information can be embedded in the converter 60 or in the audio device 80, or can be received from an external source. Shown in FIG. 7 is the situation where the information is retrieved from the optical disc. In such a case the optical disc can comprise both the input channels as the room model information.

Figure 8:
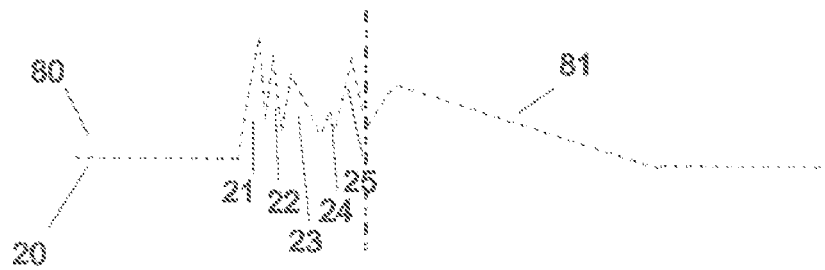
FIG. 8 shows a measured impulse response.

FIG. 8 shows the measured impulse response comprising an early part and a late part. In the illustrated embodiment, the early part and the late part are contiguous, but in alternative embodiments they may also be overlapping or spaced apart.

As disclosed above, the processing of the early part and the late part of the reverberation can be divided and treated separately.

The intensity envelope of the reverberation 20 of FIG. 2 is shown again in FIG. 8 but now with the vertical dotted line indicating the dividing point between the early part 21, 22, 23, 24, 25 and the late part 91. The dividing point is not fixed in time but is determined based on the type of sound (for instance voice, classic, jazz, pop etc) or the type of acoustical environment modelled. In the case of FIG. 8 the dividing point is chosen to be between the early section having peaks resulting from distinct dominant reflections of a relatively high amplitude, and the late part 91 having a relatively uniform decaying envelope shape without dominant peaks. As is clear from the description, the invention can advantageously be used on the early part 21, 22, 23, 24, 25 with its peaks. The late part 91 can be processed using methods and means known from the prior art or can be ignored all together.

Figure 9:
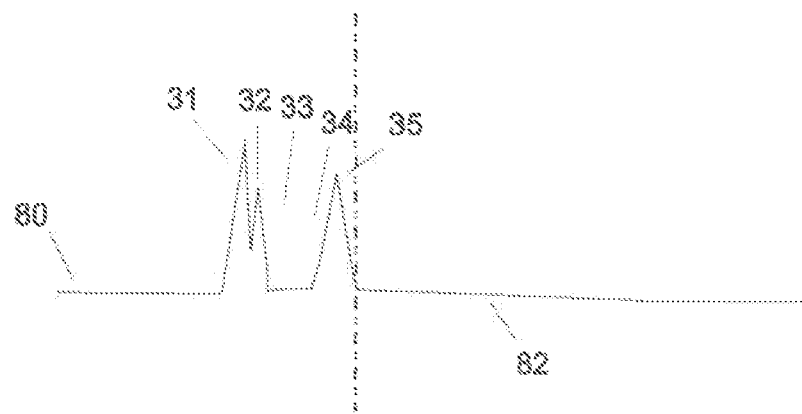
FIG. 9 shows a simulated early part.

FIG. 9 shows the simulated early part.

The simulated early part 100 of the impulse response comprises only the dominant peaks 31, 32, 33, 34, 35 as selected by using the modelling method of the present invention, equivalently to FIG. 5 but with the late part removed before applying the method of the present invention.

This results in the late part 101 of the simulated reverberation to be set to zero.

Figure 10:
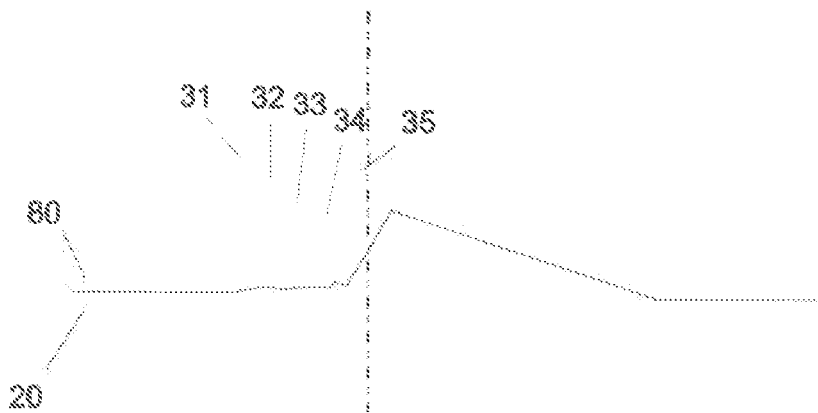
FIG. 10 shows a simulated late part.

FIG. 10 shows the simulated late part.

The modelled late part 110 of the impulse response lacks the dominant peaks 31, 32, 33, 34, 35 of the early part as the early part was removed before the processing, but includes the late part 111.

Figure 11:
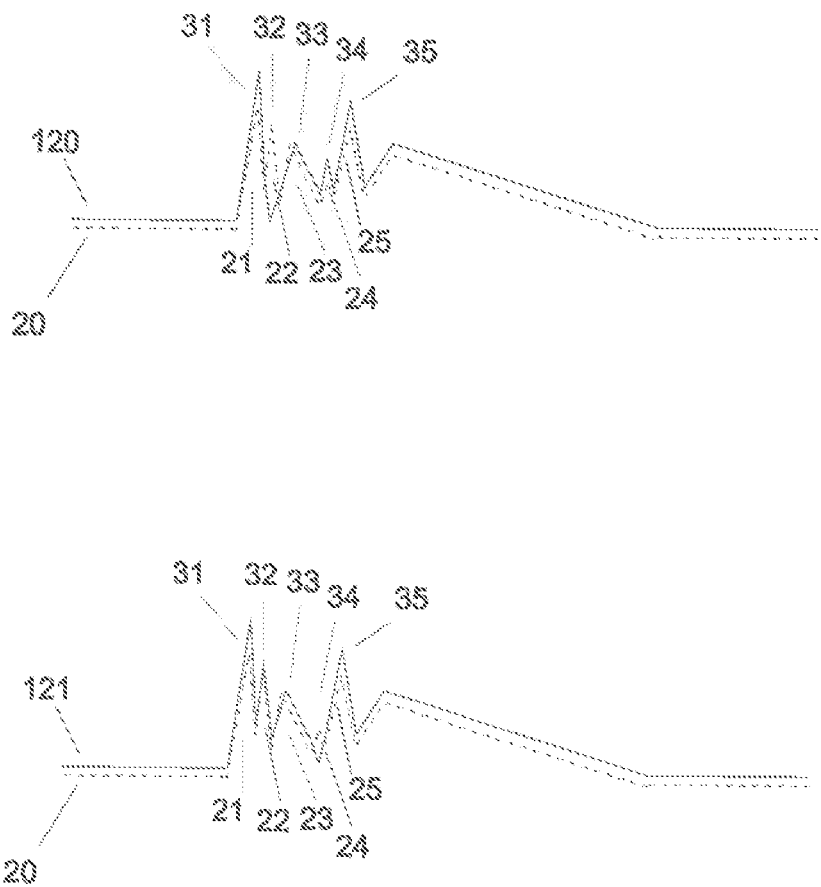
FIG. 11 shows the selection of peaks to avoid comb filter effect.

FIG. 11 shows two channels 120, 121 where the selection of peaks for use in the simplified transfer function of the model were chosen to be different so as to avoid a comb filter effect when played back in a room. For ease of explanation two identical impulse responses 120, 121 are shown, while in reality the impulse responses will slightly differ for each channel.

In the first modelled impulse response 120 the second peak 32 has been omitted, while in the second modelled impulse response 121 the fourth peak 34 has been omitted.

Although the present invention has been described with reference to specific exemplary embodiments, it will be evident that various modifications and changes may be made to these embodiments without departing from the broader scope of the invention as set forth in the claims. For example, although in the present description the signal processing has been described as if it was performed analogously, all the signal processing steps of the present invention can advantageously be performed by digital means, through digital time sampling. Accordingly, the description and drawings are to be regarded in an illustrative sense rather than a restrictive sense.

The invention claimed is:

1. A method for simplifying a model of an acoustic environment, wherein said model comprises a set of transfer functions, each transfer function corresponding to the sound propagation from a sound emitting position to a sound receiving position in said acoustic environment, the method comprising, for each transfer function, the steps of:
   calculating a first simulated reverberation of a first stimulus emitted at said sound emitting position as received at said sound receiving position by applying said transfer function to said first stimulus;
   selecting a subset of a set of local maxima in a first intensity envelope of the first simulated reverberation; and
   calculating a simplified transfer function which, applied to said first stimulus, provides a second simulated reverberation with a second intensity envelope matching said selected subset of local maxima of the first simulated reverberation.

2. A method as claimed in claim 1, wherein the number of said selected subset of local maxima is not higher than a predetermined maximum.

3. A method as claimed in claim 2, wherein said selected subset of local maxima is selected from among those above a time-intensity attenuation function.

4. A method as claimed in claim 1, wherein said selected subset of local maxima is selected from among those above a time-intensity attenuation function.

5. A method as claimed in claim 4, wherein said attenuation function is an exponential attenuation function.

6. A method as claimed in claim 5, wherein said output signal comprises an early part and a late part.

7. A method as claimed in claim 6, wherein only the early part is generated using said simplified transfer function.

8. A method as claimed in claim 7, wherein the late part is generated by algorithmic reverberation of the input signal.

9. A method as claimed in claim 5, wherein said simplified transfer function is applied by convolution with said first stimulus.

10. A method as claimed in claim 5, wherein said simplified transfer function is expressed as a combination of a signal delay and a signal attenuation for each selected local maximum, and is applied to said first stimulus in a time domain operation.

11. A method as claimed in claim 1, wherein said simplified transfer function is applied by convolution with said first stimulus.

12. A method as claimed in claim 1, wherein said simplified transfer function is expressed as a combination of a signal delay and a signal attenuation for each selected local maximum, and is applied to said first stimulus in a time domain operation.

13. A method for converting an first audio stream comprising N input channels into a second audio stream comprising M output channels, the method comprising, for each input and output channel, the steps of:
    selecting, in a model of an M-channel acoustic environment simplified using a method according to claim 1, a simplified transfer function associated with said input channel and output channel; and
    processing an input signal from said input channel by applying said selected simplified transfer function to generate at least part of an output signal for said output channel.

14. A method as claimed in claim 13, wherein M>N.

15. A method as claimed in claim 14, wherein the selected subsets of local maxima matched by the simplified transfer functions are different for at least two of the M output channels, and preferably for all M output channels.

16. A method as claimed in claim 14, wherein said output signal comprises an early part and a late part.

17. A method according to claim 16, wherein only the early part is generated using said simplified transfer function and the late part is generated by algorithmic reverberation of the input signal.

18. A method as claimed in claim 13, wherein the selected subsets of local maxima matched by the simplified transfer functions are different for at least two of the M output channels, and preferably for all M output channels.

19. A converter for converting a first audio signal comprising N input channels into a second audio signal comprising M calculated channels, using a method according to claim 13, the converter comprising:
    N inputs and M outputs; and
    a processor for applying said set of simplified transfer functions to an audio signal received on an input channel so as to obtain reverberation components of a calculated output channel; and
    a data carrier with at least coefficients associated with said set of simplified transfer functions, for use by said processor.

20. A converter as claimed in claim 19, wherein said data carrier is a transient computer memory connected to said processor.

* * * * *